United States Patent
Sakamoto et al.

(12) 
(10) Patent No.: US 6,781,337 B2
(45) Date of Patent: Aug. 24, 2004

(54) MULTI-JOINT TYPE INDUSTRIAL ROBOT (75) Inventors: Masafumi Sakamoto, Kiryu (JP); Kaoru Endo, Kiryu (JP); Katsuhiro Yamazoe, Ibara (JP); Takahiro Kobiki, Ibara (JP)

(73) Assignees: Japan Servo Co., Ltd., Tokyo (JP); Tazmo Co. Ltd., Okayama (JP)

( * ) Notice: Subject to any disclaimer, the term of this patent is extended or adjusted under 35 U.S.C. 154(b) by 0 days.

(21) Appl. No.: 10/269,020

(22) Filed: Oct. 9, 2002

(65) Prior Publication Data

US 2003/0085681 A1 May 8, 2003

(30) Foreign Application Priority Data

Oct. 17, 2001 (JP) ........................................ 2001-319385

(51) Int. Cl.[7] .............................................. G05B 19/10
(52) U.S. Cl. ............. 318/567; 318/568.12; 318/568.16; 318/568.18; 318/568.2; 318/568.21; 318/656; 318/647
(58) Field of Search ........................... 318/567, 568.12, 318/568.16, 568.18, 568.2, 568.21, 656, 647

(56) References Cited

U.S. PATENT DOCUMENTS

| | | | | |
|---|---|---|---|---|
| 4,401,360 A | * | 8/1983 | Streckmann et al. .......... | 385/26 |
| 4,430,037 A | * | 2/1984 | Bisiach .......................... | 414/4 |
| 4,633,414 A | * | 12/1986 | Yabe et al. .................. | 700/249 |
| 4,949,026 A | * | 8/1990 | Mead .......................... | 318/649 |
| 5,363,263 A | * | 11/1994 | Ohji et al. ............... | 360/281.7 |
| 5,712,552 A | | 1/1998 | Hirai et al. | |
| 5,789,890 A | | 8/1998 | Genov et al. ............... | 318/567 |
| 5,794,487 A | * | 8/1998 | Solomon et al. ......... | 74/490.03 |
| 5,944,476 A | * | 8/1999 | Bacchi et al. ............... | 414/783 |
| 6,155,768 A | * | 12/2000 | Bacchi et al. .......... | 414/416.03 |
| 6,434,293 B1 | * | 8/2002 | Igeta et al. .................... | 385/25 |

OTHER PUBLICATIONS

Rotary transformer, 2002, http://www.sansungcorning.com/02_product/P-03_1roters.html, pp 1-2.*

Contactless Rotary Electrical Couplings, Ames Research Center, Moffett Field, California, http://www.nasatech.com/briefs/mar03/ARC12072.html.*

* cited by examiner

Primary Examiner—Rina Duda
(74) Attorney, Agent, or Firm—Jordan and Hamburg LLP (57) ABSTRACT In an industrial robot having a plurality of arms, each arm is coupled with other elements, such as a mounting base, another arm, a robotic hand, and revolved by a motion of the revolvable joint. The revolvable joint has a rotary electric connecting structure such as a slip ring or a rotary transformer which can be rotated endlessly. Electric powers for driving motors by which the arms are revolved and control signals for controlling the driving of the motors are supplied or transmitted through the rotary electric connecting structure, so that the arms can be rotated endlessly without twisting or breaking of electric cables.

8 Claims, 5 Drawing Sheets

MULTI-JOINT TYPE INDUSTRIAL ROBOT

BACKGROUND OF THE INVENTION

The present invention relates to a multi-joint type industrial robot with a plurality of arms respectively coupled by a plurality of revolvable joints, which is used, for example, for conveying semiconductor wafers in manufacturing process of semiconductor devices.

Figure 7:
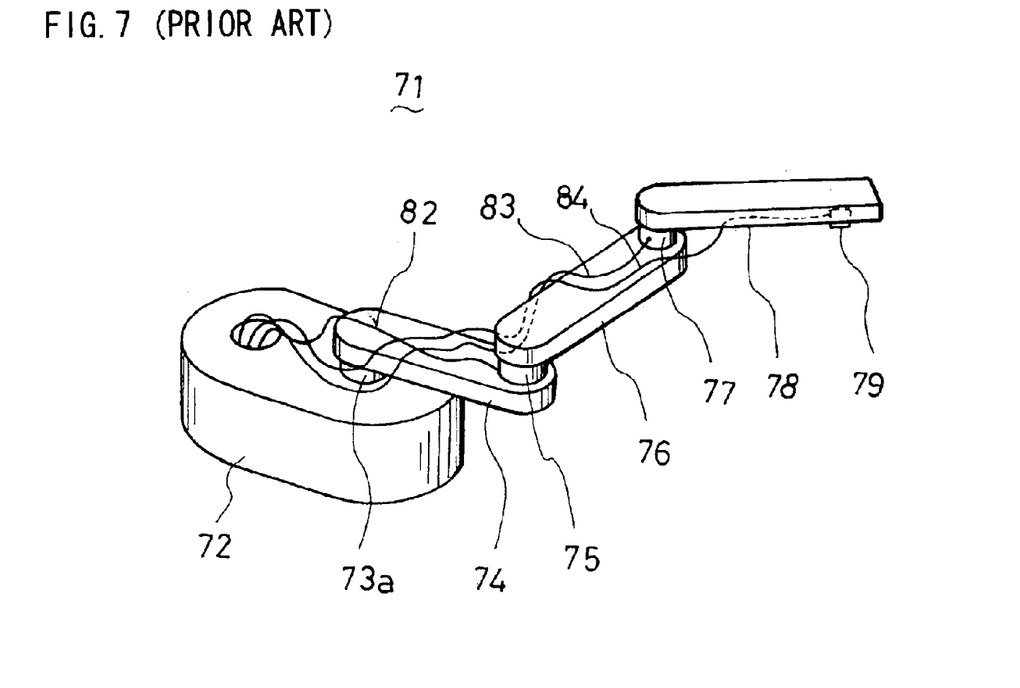
FIG. 7 is a perspective view showing an appearance of a conventional industrial robot.
Figure 8:
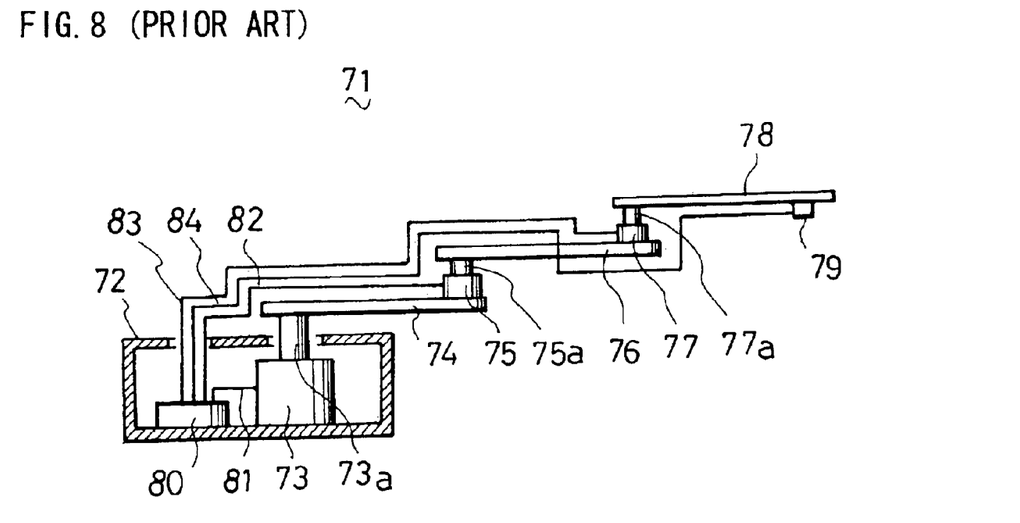
FIG. 8 is a partially sectional side view showing a wiring configuration of the conventional industrial robot.

An industrial robot with a plurality of revolvable joints is conventionally used for conveying works such as semiconductor wafers in a manufacturing facility of semiconductor devices. A configuration of the conventional industrial robot 71 with a plurality of joints is illustrated in FIGS. 7 and 8. In the industrial robot 71, a first motor 73 is provided in a mounting base 72. A first arm 74 is coupled with a drive shaft 73a of the first motor 73 in the vicinity of an end of the first arm 74. A second motor 75 is provided in the vicinity of another end of the first arm 74. A second arm 76 is coupled with a drive shaft 75a of a second motor 75 in the vicinity of an end of the second arm 76. A third motor 77 is provided in the vicinity of another end of the second arm 76. A robotic hand 78 for nipping a work such as a semiconductor wafer is coupled with a drive shaft 77a of the third motor 77 in the vicinity of an end of the robotic hand 78.

The first arm 74 is revolved by rotation force of the first motor 73. The second arm 76 is revolved by rotation force of the second motor 75. The robotic hand 78 is revolved by rotation force of the third motor 77. A sensor 79 for sensing the existence of the work is provided in the vicinity of a top end of the robotic hand 78.

A driving controller 80 is further provided in the mounting base 72. Electric cables 81, 82 and 83 are respectively provided for supplying the electric powers and driving signals to the first to third motors 73, 75 and 77. Furthermore, an electric cable 84 is provided for coupling the sensor 79 and the driving controller 80.

In the conventional industrial robot 71, the electric cables 82 to 84 are directly connected from the driving controller 80 to the motors 75 and 77 and the sensor 79, which are provided on the arms 74 and 76 and the robotic hand 78. When the arms 46 and 76 and the robotic hand 78 are revolved, the electric cables 82 to 84 are bent and/or twisted, or the electric cables 82 to 84 are wound around the arms 74 and 76 and the robotic hand 78. Thus, the electric cables 82 to 84 are easily broken down, and the revolution angles of the arms 74 and 76 and the robotic hand 78 are restricted so that the arms 74 and 76 and the robotic hand 78 cannot revolvable endlessly.

SUMMARY OF THE INVENTION

An object of the present invention is to provide an industrial robot with a plurality of joints, by which the electric cables are not bent and twisted, and not wound around the arm or robotic hand so as not to be broken by fatigue of the electric wires, and furthermore, the arms and the robotic hand can be revolved endlessly.

An industrial robot in accordance with an aspect of the present invention has a plurality of arms coupled by a plurality of revolvable joints, each of the arms can be moved by a driving force of a motor which drives each of the revolvable joints. Each of the revolvable joints can be rotated endlessly, and has a rotary electric connecting structure which can be rotated endlessly at least for supplying an electric power from a control circuit to the motor.

By such a configuration, the electric power can be supplied to the motor by the rotary electric connecting structure with using no electric cable while the arm is revolved. Thus, the arm can be revolved endlessly without twisting or breaking of electric cables.

DETAILED DESCRIPTION OF THE EMBODIMENT

Figure 1:
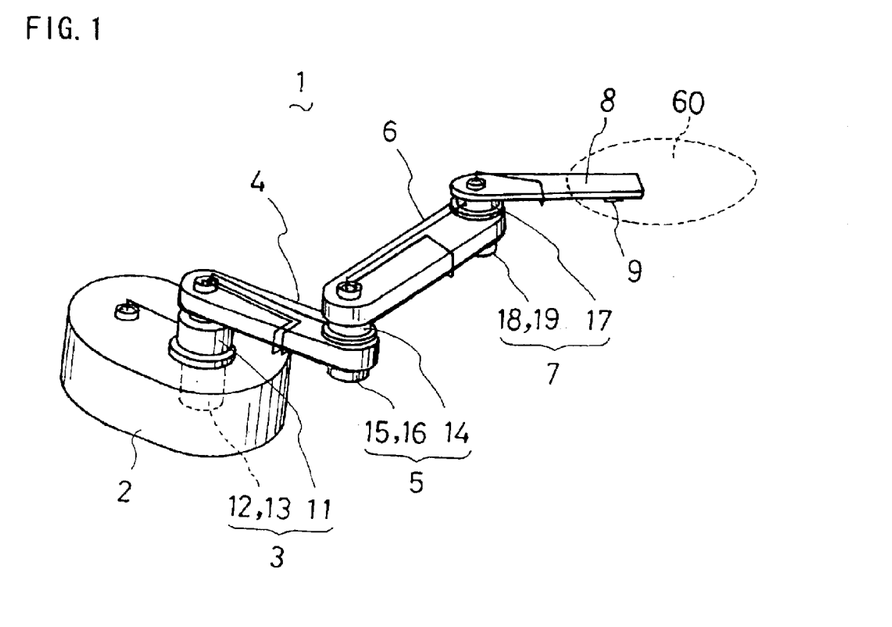
FIG. 1 is a perspective view showing an appearance of a first embodiment of an industrial robot in accordance with the present invention.
Figure 2:
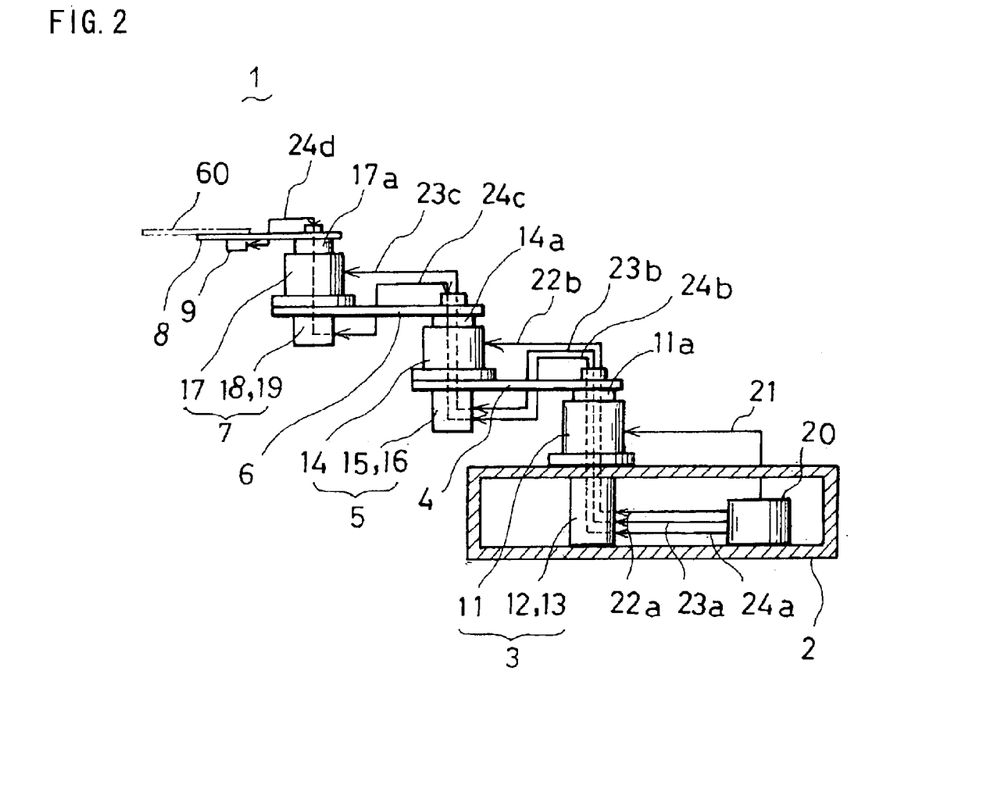
FIG. 2 is a partially sectional side of the industrial robot in the first embodiment.

A first embodiment of an industrial robot in accordance with the present invention is described. FIG. 1 shows an appearance of the industrial robot 1 in the first embodiment. FIG. 2 shows a partially sectional side view of the industrial robot 1. The industrial robot 1 comprises a mounting base 2 which will be fixed on a floor of a manufactory, a fist revolvable joint 3, a first arm 4 coupled with the mounting base 2 by the first revolvable joint 3, a second revolvable joint 5, a second arm 6 coupled with the first arm 4 by the second revolvable joint 5, a third revolvable joint 7 and a robotic hand 8 coupled with the second arm 6 by the third revolvable joint 7. The robotic hand 8 is used for nipping a semiconductor wafer 60. A sensor 9 for sensing the existence of the semiconductor wafer 60 is provided in the vicinity of a top end of the robotic hand 8.

Figure 3:
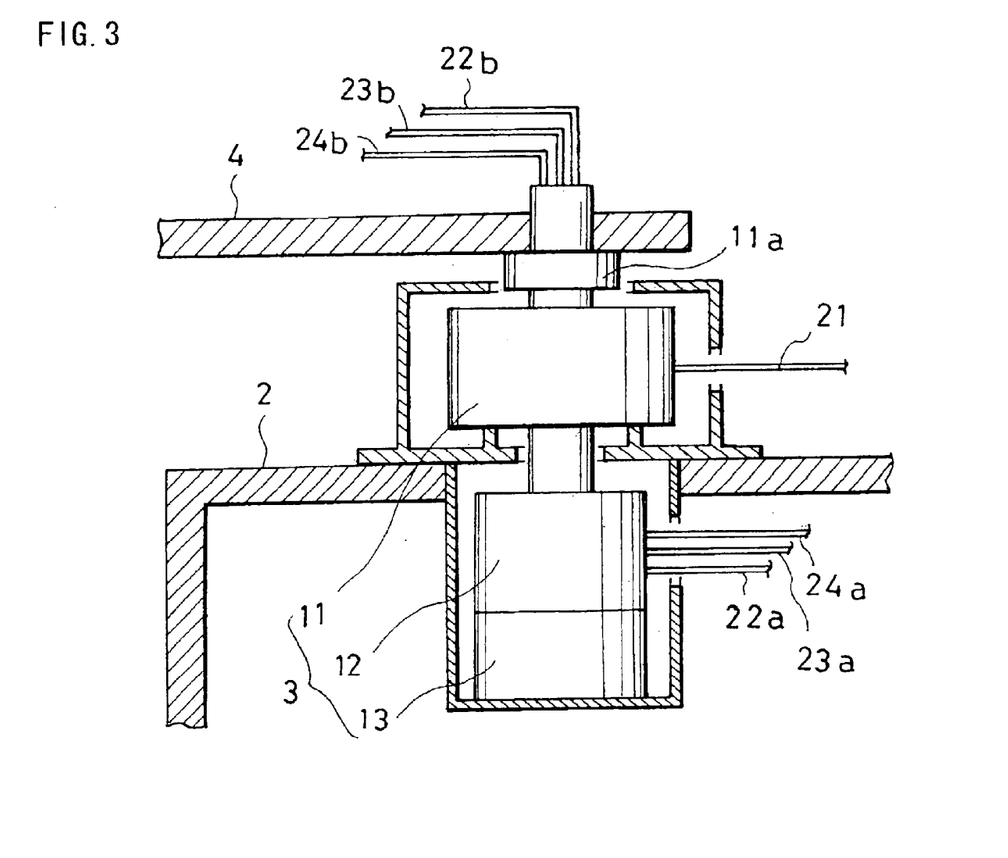
FIG. 3 is a cross sectional view showing a configuration in a portion of a first revolvable joint of the industrial robot in the first embodiment.

FIG. 3 shows a configuration of in a portion of the first revolvable joint 3. The second revolvable joint 5 and the third revolvable joint 7 respectively have substantially the same configurations.

With reference to FIGS. 2 and 3, the first revolvable joint 3 comprises a motor 11, a slip ring 12 and an encoder 13 for sensing a rotation angle of a drive shaft 11a of the motor 11 or for sensing a revolution angle of the first arm 4. A rotation shaft of the slip ring 12 and a rotation shaft of the encoder 13 are coupled so that the slip ring 12 and the encoder 13 are integrated to be unitized. The first arm 4 is coupled with the drive shaft 11a of the motor 11 in the vicinity of a base end thereof, so that the first arm 4 can be revolved around the drive shaft 11a in a horizontal plane by the driving force of the motor 11. Since the drive shaft 11a of the motor 11 is formed to be hollow, electric cables 22b, 23b and 24b are aligned from a top face of the first arm 4 to the slip ring 12 through the inside of the drive shaft 11a of the motor 11.

With reference to FIG. 2, the second revolvable joint 5 comprises a motor 14, a slip ring 15 and an encoder 16 for sensing a rotation angle of a drive shaft 14a of the motor 14 or for sensing a revolution angle of the second arm 6. The slip ring 15 and the encoder 16 are coupled so that the slip ring 15 and the encoder 16 are integrated to be unitized. The second arm 6 is coupled with the drive shaft 14a of the motor 14 in the vicinity of a base end thereof, so that the second arm 6 can be revolved around the drive shaft 14a in a horizontal plane by the driving force of the motor 14. Since the drive shaft 14a of the motor 14 is formed to be hollow, electric cables 23c and 24c are aligned from a top face of the second arm 6 to the slip ring 15 through the inside of the drive shaft 14a of the motor 14.

The third revolvable joint 7 comprises a motor 17, a slip ring 18 and an encoder 19 for sensing a rotation angle of a drive shaft 17a of the motor 17 or for sensing a revolution angle of the robotic hand 8. The slip ring 18 and the encoder 19 are integrated to be unitized. The robotic hand 8 is coupled with the drive shaft 17a of the motor 17 in the vicinity of a base end thereof, so that the robotic hand 8 can be revolved around the drive shaft 17a in a horizontal plane by the driving force of the motor 17. Since the drive shaft 17a of the motor 17 is formed to be hollow, an electric cable 24d is aligned from a top face of the robotic hand 8 to the slip ring 18 through the inside of the drive shaft 17a of the motor 17.

A control circuit 20 for controlling the industrial robot 1 is provided in an inside of the mounting base 2. The control circuit 20 is configured by a microcomputer system for generating control signals and an electric power supply for generating electric powers for driving the motors. An electric cable 21 is an electric power cable directly connected between the control circuit 20 and the motor 11 provided on the mounting base 2, which is used for supplying an electric power for driving the motor 11. The electric cables 22a and 22b are electric power cables connected between the control circuit 20 and the motor 14 provided on the first arm 4 via the slip ring 12, which are used for supplying an electric power for driving the motor 14. The electric cables 23a, 23b and 23c are electric power cables connected between the control circuit 20 and the motor 17 provided on the second arm 6 via the slip rings 12 and 15, which are used for supplying an electric power for driving the motor 17. The electric cables 24a, 24b, 24c and 24d are signal cables connected between the control circuit 20 and the sensor 9 provided on the robotic hand 8 via the slip rings 12, 15 and 18, which are used for transmitting the signals corresponding to sensing results of the sensor 9 and corresponding to the electric power for activating the sensor 9 between the control circuit 20 and the sensor 9. Signal cables connected between the control circuit 20 and the encoders 16 and 19 for transmitting sensing signals corresponding to the rotation angles of the drive shafts 11a, 14a and 17a of the motors 11, 14 and 17 are not illustrated in the figure. They, however, are aligned in parallel with the electric cables 22a, 22b, 23a, 23b and 23c via the slip rings 12 and 15. A sensing signal from the encoder 13 is directly inputted to the control circuit 20.

Figure 4A:
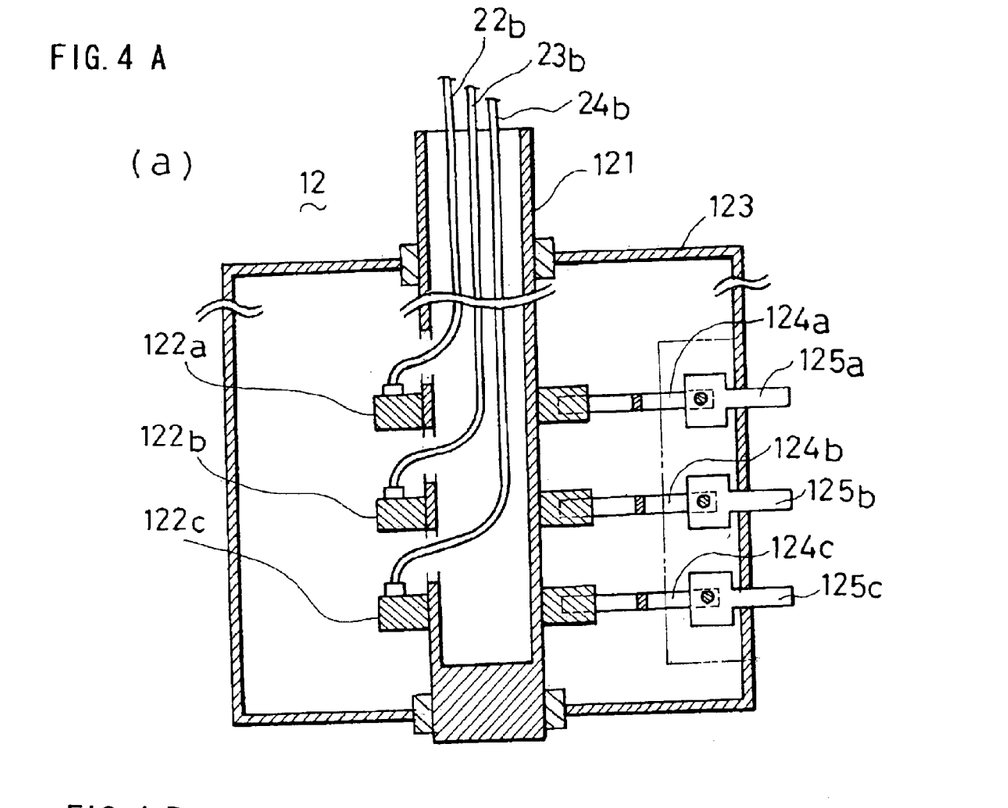
FIG. 4A is a sectional side view showing a configuration of a slip ring in the first embodiment.
Figure 4B:
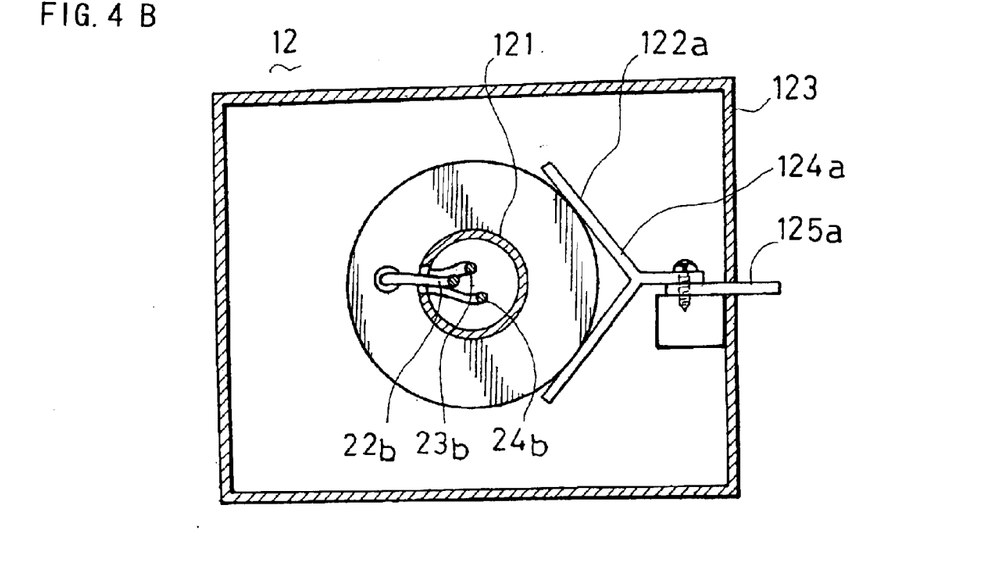
FIG. 4B is a sectional plan view of the slip ring in the first embodiment.

FIG. 4A is a sectional side view of the slip ring 12, and FIG. 4B is a sectional plan view of the slip ring 12. As can be seen from FIGS. 4A and 4B, current collecting rings (conductive rotary members) 122a, 122b and 122c are fixed on an outer face of the rotation shaft 121 of the slip ring 12. Brushes (conductive stationary members) 124a, 124b and 124c and terminals 125a, 125b and 125c are provided in an inside of a housing 123 of the slip ring 12. The brushes 124a, 124b and 124c are held so as to contact with the side faces of the current collecting rings 122a, 122b and 122c. While the rotation shaft 121 has been rotated, the brushes 124a, 124b and 124c slide on the side faces of the current collecting rings 122a, 122b and 122c with maintaining the electrically contacting states.

The rotation shaft 121 is a hollow shaft so that the electric cables 22b, 23b and 24b are aligned through the inside of the rotation shaft 121 so as to be connected to the current collecting rings 122a, 122b and 122c. On the other hand, the electric cables 22a, 23a and 24a are respectively connected to the terminals 125a, 125b and 125c. By such a configuration, the electric cables 22a, 23a and 24a are respectively electrically connected to the electric cables 22b, 23b and 24b. An end of the rotation shaft 121 is coupled with the drive shaft 11a of the motor 11 so as to be rotated with the drive shaft 11a by the driving force of the motor 11. The other end of the rotation shaft 121 is coupled to the rotation shaft (not shown in the figure) of the encoder 13, which is integrally unitized with the slip ring 12.

When the motor 11 is driven for revolving the first arm 4, the rotation shaft 121 of the slip ring 12 is rotated the same angle as the revolution angle of the first arm 4, since the top end of the drive shaft 11a is coupled with the first arm 4 and the bottom end of the drive shaft 11a is coupled with the rotation shaft 121 of the slip ring 12. Connecting points such as soldering lands of the electric cables 22b, 23b and 24b on the current collecting rings 122a, 122b and 122c are rotated by a rotation angle the same as the revolution angle of the first arm 4 corresponding to the revolution of the first arm 4. In other words, the connecting points of the electric cables 22b, 23b and 24b on the current collecting rings 122a, 122b and 122c can be regarded to be fixed on the first arm 4. On the other hand, the other ends of the electric cables 22b, 23b and 24b are connected to the slip ring 15 of the second revolvable joint 5 which is fixed on the first arm 4. Thus, the relative positions of the connecting points of the electric cables 22b, 23b and 24b on the current collecting rings 122a, 122b and 122c with respect to the connecting points of the electric cables 22b, 23b and 24b to the slip ring 15 are not varied, even when the first arm 4 is revolved. As a result, the electric wires 22b, 23b and 24b may not be twisted themselves and may not be wound around the first arm 4, even when the first arm 4 is revolved. The electric cables 22b, 23b and 24b are never broken by the revolution of the first arm 4.

The slip rings 15 and 17 respectively have substantially the same configuration as that of the slip ring 12 shown in FIGS. 4A and 4B. Thus, the configurations of the slip rings 15 and 17 are not illustrated. As mentioned above with reference to FIG. 2, the electric cables 23b and 24b are respectively electrically connected to the electric cables 23c and 24c via the slip ring 15. It can easily be understood that the electric cables 23c and 24c may not be twisted themselves and may not be wound around the second arm 6, even when the second arm 6 is revolved. Similarly, the electric cable 24c is electrically connected to the electric cable 24d via the slip ring 18. It can easily be understood that the electric cable 24d may not be twisted itself and may not be wound around the robotic hand 8, even when the robotic hand 8 is revolved.

By such a configuration, the electric powers can be supplied from the control circuit 20 to the motors 11, 14 and 17, and the sensing signals and the electric power can be transmitted between the control circuit 20 and the sensor 9, while the rotation shafts of the slip rings 12, 15 and 18 are rotated. Furthermore, the revolution angles of the first arm 4, the second arm 6 and the robotic hand 8 are not restricted, so that they can be revolved endlessly.

Figure 5:
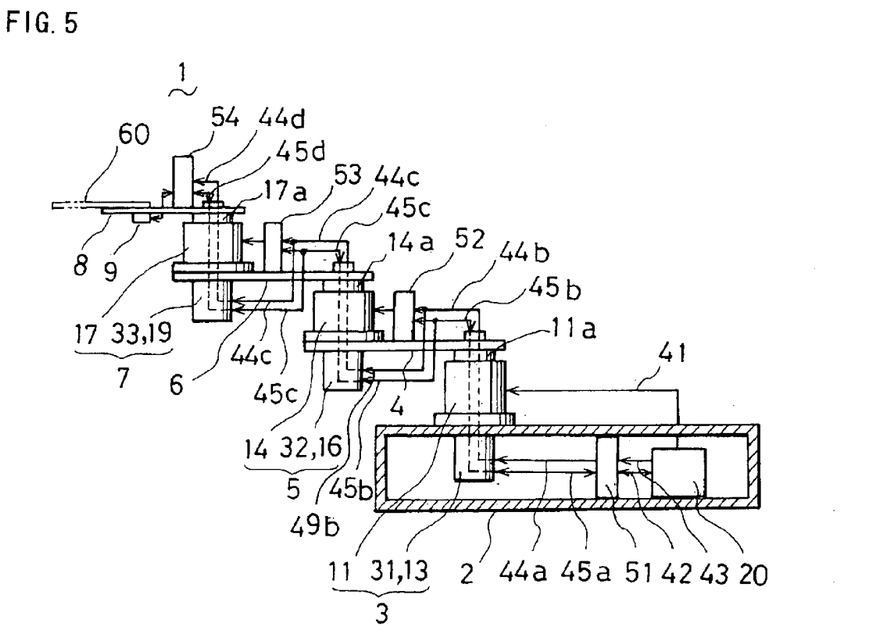
FIG. 5 is a partially sectional side of an industrial robot in a second embodiment of the present invention.

A second embodiment of an industrial robot in accordance with this invention is described. FIG. 5 shows a partially sectional side view of the industrial robot 1 in the second embodiment.

The industrial robot 1 comprises a mounting base 2, a first arm 4 coupled with the mounting base 2 by a first revolvable joint 3, a second arm 6 coupled with the first arm 4 by a second revolvable joint 5 and a robotic hand 8 coupled with the second arm 6 by a third revolvable joint 7. A sensor 9 for sensing the existence of a semiconductor wafer 60 is provided on the robotic hand 8.

In the second embodiment, the first revolvable joint 3 comprises a motor 11, a rotary transformer 31 and an encoder 13 for sensing a rotation angle of a drive shaft 11a of the motor 11. A rotation shaft of the rotary transformer 31 and a rotation shaft of the encoder 13 are coupled so that the rotary transformer 31 and the encoder 13 are integrated to be unitized. Similarly, the second revolvable joint 5 comprises a motor 14, a unitized rotary transformer 32 and an encoder 16. The third revolvable joint 7 comprises a motor 17 and a unitized rotary transformer 33 and an encoder 19. The motors 11, 14 and 17 and the encoders 13, 16 and 19 respectively have the same configuration as those in the above-mentioned first embodiment.

An electric cable 41 is an electric power cable directly connected between the control circuit 20 and the motor 11 provided on the mounting base 2, which is used for supplying an electric power for driving the motor 11. An electric cable 42 is an electric power cable for supplying an electric power to each department (mainly the motors 14 and 17) of the industrial robot 1. An electric cable 43 is a serial signal transmitting cable serially for transmitting control signals to the each department (mainly modulator/demodulators 52 and 53) of the industrial robot 1, and for transmitting sensing signals from the encoders 13, 16 and 19 and the sensor 9 to the control circuit 20.

The electric cables 42 and 43 are respectively connected to a modulator/demodulator 51. The modulator/demodulator 51 modulates the electric power to a driving power transmitting signal which can be transmitted by the rotary transformers 31, 32 and 33. The modulator/demodulator 51 further modulates the control signals to control information transmitting signals which can be transmitted by the rotary transformers 31, 32 and 33. Electric cables 44a, 44b, 44c and 44d are signal transmitting cables for transmitting the driving power transmitting signal modulated by the modulator/demodulator 51. Electric cables 45a, 45b, 45c and 45d are signal transmitting cables for transmitting the control information transmitting signal modulated by the modulator/demodulator 51. The electric cables 45a, 45b, 45c and 45d further transmit sensing result transmitting signals which will be described below.

The electric cables 44b and 45b are connected to the rotary transformer 31 from a top face of the first arm 4 through an inside of a drive shaft 11a of the motor 11. The electric cables 44c and 45c are connected to the rotary transformer 32 from a top face of the second arm 6 through an inside of a drive shaft 14a of the motor 14. The electric cables 44d and 45d are connected to the rotary transformer 33 form a top face of the robotic hand 8 through an inside of a drive shaft 17a of the motor 17.

The modulator/demodulator 52 demodulates the control information transmitting signal to a control signal. Subsequently, the modulator/demodulator 52 demodulates the driving power transmitting signal to a driving power by using the demodulated control signal, and the demodulated driving power is supplied to the motor 11. Furthermore, the modulator/demodulator 52 modulates a sensing signal of the encoder 16 corresponding to a revolution angle of the first arm 4 to a sensing result transmitting signal which can be transmitted by the rotary transformer 31.

Similarly, the modulator/demodulator 53 demodulates the control information transmitting signal to a control signal. Subsequently, the modulator/demodulator 53 demodulates the driving power transmitting signal to a driving power by using the demodulated control signal, and the demodulated driving power is supplied to the motor 14. Furthermore, the modulator/demodulator 53 modulates a sensing signal of the encoder 19 corresponding to a revolution angle of the second arm 6 to a sensing result transmitting signal which can be transmitted by the rotary transformers 31 and 32.

A modulator/demodulator 54 demodulates the control information transmitting signal to a control signal. Subsequently, the modulator/demodulator 54 demodulates the driving power transmitting signal to a driving power by using the demodulated control signal, and the demodulated driving power is supplied to the sensor 9. Furthermore, the modulator/demodulator 54 modulates a sensing signal of the sensor 9 corresponding to information whether a semiconductor wafer exists or not to a sensing result transmitting signal which can be transmitted by the rotary transformers 31, 32 and 33.

The modulator/demodulator 51 demodulates the sensing result transmitting signals from the modulator/demodulators 52, 52 and 54 to the sensing signals from the sensor 9 and the encoders 16 and 19, and the demodulated sensing signals are inputted to the control circuit 20. The control circuit 20 controls the industrial robot 1 by using the sensing signals. A sensing signal of the encoder 13 is directly inputted to the control circuit 20.

Figure 6:
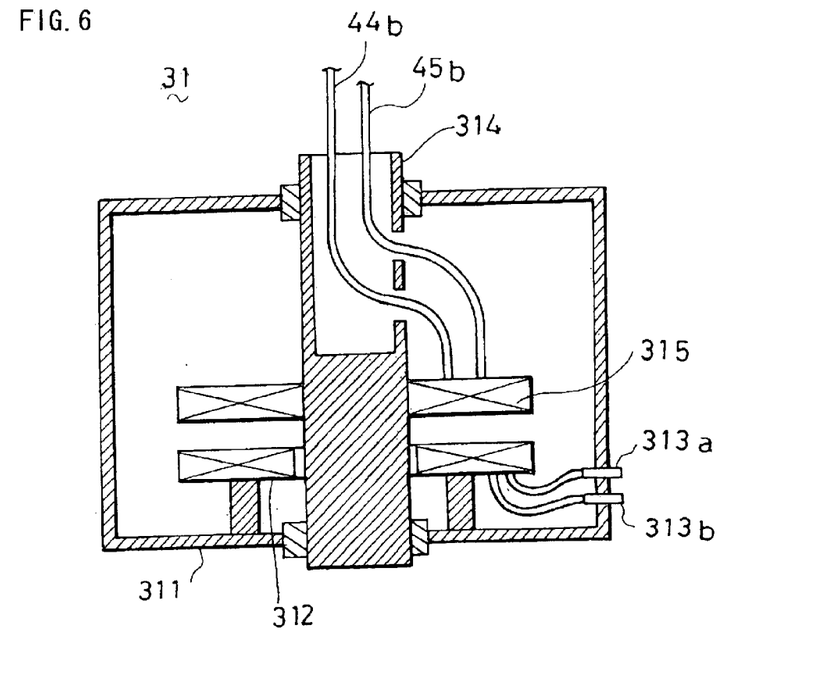
FIG. 6 is a sectional side view showing a configuration of a rotary transformer in the second embodiment.

FIG. 6 shows a configuration of the rotary transformer 31. A stationary primary coil 312 and terminals 313a and 313b connected to the stationary transformer 312 are provided on a bottom of a housing 311. A rotary secondary coil 315 is fixed on a rotation shaft 314 of the rotary transformer 31. By such a configuration, the stationary primary coil 312 and the rotary secondary coil 315 are electrically connected by electromagnetic interactive induction. The rotary transformer 31 has a multi-channel configuration by which two different types of the signals can transmit at the same time.

Since the stationary primary coil 312 and the rotary secondary coil 315 of the rotary transformer 31 are electrically connected by electromagnetic interactive induction, the driving power transmitting signal and the control information transmitting signals must be alternating current signals or pulsating current signals. The modulator/demodulator 51 modulates the electric power to the alternating or pulsating driving power transmitting signal. Furthermore, the modulator/demodulator 51 modulates the control signals to the alternating or pulsating control information transmitting signals.

Each of the modulator/demodulators 52, 53 and 54 demodulates the alternating or pulsating driving power transmitting signal to the electric power, and demodulates the alternating or pulsating control information transmitting signal to the control signal. Each of the modulator/demodulators 52 and 53 has, for example, a switching circuit for switching on and off of supplying the electric power to the motor 14 or 17. The switching circuits are controlled by the control signals respectively having, for example, the identification with respect to the modulator/demodulators 52 and 53 or the motors 14 and 17.

The rotary shaft 314 has a hollow through which the electric cables 44b and 45b are connected to the rotary secondary coil 315. The electric cables 44b and 45b are further aligned in an inside of a hollow drive shaft 11a of the motor 11. The electric cables 44a and 45a which are not shown in FIG. 6 will be connected to the terminals 313a and 313b, so that the electric cables 44a and 44b, 45a and 45b will be electrically connected. An end of the rotation shaft 314 is coupled with the drive shaft 11a of the motor 11 so as to be rotated with each other. The other end of the rotation shaft 314 is coupled with a rotation shaft of the encoder 13 which is integrated with the rotary transformer 31.

When the motor 11 is driven for revolving the first arm 4, the rotation shaft 314 of the rotary transformer 31 is rotated the same angle as the revolution angle of the first arm 4, since the top end of the drive shaft 11a of the motor 11 is coupled with the first arm 4 and the bottom end of the drive shaft 11a is coupled with the rotation shaft 314 of the rotary transformer 31. Connecting points of the electric cables 44b and 45b on the rotary secondary coil 315 are rotated by the same rotation angle as the rotation angle of the rotation shaft 314 corresponding to the revolution of the first arm 4. In other words, the connecting points of the electric cables 44b and 45b on the rotary secondary coil 315 can be regarded to be fixed on the first arm 4. On the other hand, the other ends of the electric cables 44b and 45b are connected to the rotary transformer 32 of the second revolvable joint 5 which is fixed on the first arm 4. Thus, the relative positions of the connecting points of the electric cables 44b and 45b on the rotary secondary coil 315 with respect to the connecting points of the electric cables 44b and 45b to terminals of a stationary primary coil of the rotary transformer 32 are not varied, even when the first arm 4 is revolved. As a result, the electric wires 44b and 45b may not be twisted themselves and may not be wound around the first arm 4, even when the first arm 4 is revolved.

The rotary transformers 32 and 33 respectively have substantially the same configuration as that of the rotary transformer 31 shown in FIG. 6. Thus, the configurations of the rotary transformers 32 and 33 are not illustrated. As mentioned above with reference to FIG. 5, the electric cables 44b and 45b are respectively electrically connected to the electric cables 44c and 45c via the rotary transformer 32. It is easily understood that the electric cables 44c and 45c may not be twisted themselves and may not be wound around the second arm 6, even when the second arm 6 is revolved. Similarly, the electric cables 44c and 45c are electrically connected to the electric cables 44d and 45d via the rotary transformer 33. It is easily understood that the electric cables 44d and 45d may not be twisted themselves and may not be wound around the robotic hand 8, even when the robotic hand 8 is revolved.

By such a configuration, the electric powers can be supplied from the control circuit 20 to the motors 11, 14 and 17 and the sensor 9, and the sensing signals can be transmitted between the control circuit 20 and the sensor 9, and the encoders 13, 16 and 19 while the rotation axes of the rotary transformers 31, 32 and 33 are rotated. Furthermore, the revolution angles of the first arm 4, the second arm 6 and the robotic hand 8 are not restricted, so that the can be revolved endlessly.

This application is based on Japanese patent application 2001-319385 filed in Japan, the contents of which are hereby incorporated by references.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. An industrial robot, comprising:

a plurality of arms coupled by a plurality of revolvable joints which are endlessly rotatable;

motors, each being provided respectively at each of the revolvable joints, said motors each having a hollow drive shaft, each of the arms being movable by a driving force of a respective one of the motors;

each of the revolvable joints including a rotary electric connecting structure which can be rotated endlessly at least for supplying an electric power from a control circuit to an associated one of the motors, each of the revolvable joints further including an encoder being coupled with a rotation shaft of the rotary electric connecting structure; and electric cables being directed through an inside of the hollow drive shaft of at least one of the motors.

2. The industrial robot in accordance with claim 1, wherein:

the rotary electric connecting structure is a slip ring structure including at least one conductive rotary member which can be rotated in correspondence with revolution of a corresponding one of the arms and at least one conductive stationary member which is not rotated in correspondence with the revolution of the corresponding one of the arms; and electric connection is realized by slipping contact of the at least one rotary member and the at least one stationary member.

3. The industrial robot in accordance with claim 2, wherein the slip ring structure is further used for transmitting a sensing signal from the encoder to the control circuit.

4. The industrial robot in accordance with claim 1, wherein:

the rotary electric connecting structure includes a rotary transformer having a rotary secondary coil which can be rotated in correspondence with revolution of a corresponding one of the arms, and a stationary primary coil which is not rotated in correspondence with the revolution of the corresponding one of the arms; and electric connection is realized by electromagnetic interactive induction between the stationary primary coil and the rotary secondary coil.

5. The industrial robot in accordance with claim 4, wherein the rotary transformer is further used for transmitting a sensing signal from the encoder to the control circuit.

6. The industrial robot in accordance with claim 2, wherein:

said at least one conductive rotary member includes axially spaced rotary members each having an outer electrical contact surface coaxial with a rational axis thereof; and said at least one stationary member includes stationary members each with contact the outer electrical contact surface of a respective one of said axially spaced rotary members.

7. The industrial robot in accordance with claim 6, wherein said stationary members are each generally Y-shaped having a base portion connected to a terminal and two arm portions serving as bushes, each of said arm portions extending divergently from the base portion and tangentially contacting the outer electrical contact surface of the respective one of said axially spaced rotary members.

8. An industrial robot, comprising:

a plurality of arms coupled by a plurality of revolvable joints, each of the arms being movable by a driving force of a motor which drives each of the revolvable joints, each of the revolvable joints being endlessly rotatable, and having a rotary electric connecting structure which can be rotated endlessly at least for supplying an electric power from a control circuit to the motor, the rotary electric connecting structure being a rotary transformer having a rotary secondary coil which can be rotated in correspondence with revolution of a corresponding one of the arms, and a stationary primary coil which is not rotated in correspondence with the revolution of the corresponding one of the arms, and electric connection being realized by electromagnetic interactive induction between the stationary primary coil and the rotary secondary coil, the rotary transformer being further used for transmitting a sensing signal from the encoder to the control circuit; and a plurality of modulator/demodulator units for modulating the electric power supplied from the control circuit and control signals transmitted from the control circuit to other signals which can be electrically connected by the electromagnetic interactive induction of the rotary transformer, and for demodulating modulated other signals to the electric power and the control signals.

* * * * *